United States Patent
Yang (10) Patent No.: US 11,570,614 B2
(45) Date of Patent: Jan. 31, 2023

(54) WIRELESS COMMUNICATION METHOD AND DEVICE

(71) Applicant: GUANGDONG OPPO MOBILE TELECOMMUNICATIONS CORP., LTD., Guangdong (CN)

(72) Inventor: Ning Yang, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 115 days.

(21) Appl. No.: 16/496,401

(22) PCT Filed: Mar. 22, 2017

(86) PCT No.: PCT/CN2017/077766
§ 371 (c)(1),
(2) Date: Sep. 20, 2019

(87) PCT Pub. No.: WO2011/170804
PCT Pub. Date: Sep. 27, 2018

(65) Prior Publication Data
US 2020/0382945 A1     Dec. 3, 2020

(51) Int. Cl.
*H04W 8/24* (2009.01)
*H04W 76/15* (2018.01)
(Continued)

(52) U.S. Cl.
CPC ............ *H04W 8/24* (2013.01); *H04B 7/0413* (2013.01); *H04W 24/02* (2013.01); *H04W 72/048* (2013.01); *H04W 76/15* (2018.02)

(58) Field of Classification Search
CPC ....... H04W 8/24; H04W 24/02; H04W 76/15; H04W 72/048; H04B 7/0413
See application file for complete search history.

(56) References Cited

U.S. PATENT DOCUMENTS

| 9,532,358 | B2 | 12/2016 | Chen et al. |
| 2009/0046596 | A1* | 2/2009 | Ewe .................. H04W 36/0033 370/252 |

(Continued)

FOREIGN PATENT DOCUMENTS

| CN | 101527956 A | 9/2009 |
| CN | 101884234 A | 11/2010 |

(Continued)

OTHER PUBLICATIONS

First Office Action of the Indian application No. 201917039330, dated Dec. 30, 2020.

(Continued)

*Primary Examiner* — Muthuswamy G Manoharan
(74) *Attorney, Agent, or Firm* — Ladas & Parry, LLP (57) ABSTRACT

Embodiments of the present application provide a wireless communication method and device, able to improve communication performance and avoid damages to terminal hardware. The method comprises: a terminal device sending a first message to an access network device, the first message being used for carrying first capacity information and/or first function parameter information, the first capacity information being used for instructing the access network device to update the maximum communication capacity of the terminal device to a first communication capacity, the first function parameter information being used for instructing the access network device to update the function parameter or parameter range of the terminal device for communication to a first function parameter or parameter range; and the terminal device receiving a second message sent by the access network device, the second message carrying the function parameter or parameter range configured by the access network device for the terminal device according to (Continued)

the first capacity information and/or the first function parameter information.

16 Claims, 4 Drawing Sheets

(51) Int. Cl.
  *H04W 24/02*  (2009.01)
  *H04W 72/04*  (2009.01)
  *H04B 7/04*  (2017.01)
  *H04B 7/0413*  (2017.01)

(56) References Cited

U.S. PATENT DOCUMENTS

| | | | |
|---|---|---|---|
| 2010/0130217 A1* | 5/2010 | Wu | H04W 36/0033 370/252 |
| 2010/0272051 A1 | 10/2010 | Fu | |
| 2012/0178494 A1 | 7/2012 | Haim | |
| 2014/0112247 A1 | 4/2014 | Chen et al. | |
| 2014/0355538 A1 | 12/2014 | Chen et al. | |
| 2016/0029275 A1 | 1/2016 | Guo et al. | |
| 2016/0157228 A1 | 6/2016 | Yum et al. | |
| 2017/0019243 A1 | 1/2017 | Ahn et al. | |
| 2017/0346695 A1* | 11/2017 | Li | H04W 72/048 |
| 2018/0199185 A1* | 7/2018 | Tenny | H04W 8/22 |

FOREIGN PATENT DOCUMENTS

| | | |
|---|---|---|
| CN | 102438281 A | 5/2012 |
| CN | 103220074 A | 7/2013 |
| CN | 103974432 A | 8/2014 |
| CN | 105611539 A | 5/2016 |
| CN | 106200186 A | 12/2016 |
| CN | 106332315 A | 1/2017 |
| EP | 3589014 A1 | 1/2020 |
| JP | 2015536612 A | 12/2015 |
| KR | 20150079709 A | 7/2015 |
| RU | 2009107843 A | 9/2010 |
| WO | 2010005036 A1 | 1/2010 |
| WO | 2015138079 A1 | 9/2015 |
| WO | 2015142008 | 9/2015 |
| WO | 2016188312 A1 | 12/2016 |
| WO | 2018130047 A1 | 7/2018 |

OTHER PUBLICATIONS

First Office Action of the Canadian application No. 3057178, dated Nov. 4, 2020.
First Office Action of the Chinese application No. 201911312614.2, dated Nov. 2, 2020.
Written Opinion of the Singaporean application No. 11201908770X, dated Oct. 21, 2020.
Second Office Action of the Chilean application No. 201902653, dated Dec. 18, 2020.
International Search Report in the international application No. PCT/CN2017/077766, dated Dec. 6, 2017.
Written Opinion of the International Search Authority in the international application No. PCT/CN2017/077766, dated Dec. 6, 2017.
Notice of Allowance of the Russian application No. 2019133595, dated Jul. 28, 2020.
First Office Action of the Chilean application No. 201902653, dated Aug. 19, 2020.
First Office Action of the European application No. 17902241.3, dated Oct. 8, 2020.
Huawei et al: "Thermal issues with high capability UEs", 3GPP Draft; R2-1701835, 3rd Generation Partnership Project (3GPP), Mobile Competence Centre ; 650, Route Des Lucioles ; F-06921 Sophia-Antipolis Cedex ; France, vol. RAN WG2, No. Athens, Greece; Feb. 13, 2017-Feb. 17, 2017 Feb. 12, 2017 (Feb. 12, 2017), XP051212399, Retrieved from the Internet: URL:http://www.3gpp.org/ftp/Meetings_3GPP_SYNC/RAN2/Docs/ [retrieved on Feb. 12, 2017] * sections 1-4 *.
"3rd Generation Partnership Project; Technical Specification Group Radio Access Network; ; Study on New Radio (NR) Access Technology (Release 14)", 3GPP Standard Technical Specification ; 3GPP TR 38.912, 3rd Generation Partnership Project (3GPP), Mobile Competence Centre ; 650, Route Des Lucioles ; F-06921 Sophia-Antipolis Cedex ; France, vol. TSG RAN, No. V1.0.0, Mar. 16, 2017 (Mar. 16, 2017), pp. 1-73, XP051290551.
Supplementary European Search Report in the European application No. 17902241.3, dated Feb. 4, 2020.
English translation of the Written Opinion of the International Search Authority in the international application No. PCT/CN2017/077766, dated Dec. 6, 2017.
Second Office Action of the European application No. 17902241.3, dated Apr. 7, 2021.
Vivo, "Use cases and signalling for UE initiating radio capability update", 3GPP TSG-RAN WG2 Meeting #97 R2-1701481, Athens, Greece, Feb. 13-17, 2017.
First Office Action of the Japanese application No. 2019-552133, dated Feb. 19, 2021.
First Office Action of the Korean application No. 10-2019-7027811, dated Mar. 12, 2021.
Office Action of the Taiwanese application No. 107105080, dated Apr. 28, 2021.
Second Office Action of the Canadian application No. 3057178, dated Aug. 30, 2021.
Third Office Action of the European application No. 17902241.3, dated Jan. 26, 2022.
Office Action of the Australian application No. 2017405765, dated Feb. 9, 2022.
First Office Action of the Israeli application No. 269504, dated Dec. 27, 2021.
First Office Action of the Indonesian application No. P00201909464, dated Dec. 14, 2021.
Second Office Action of the Canadian application No. 3057178, dated Jan. 6, 2022.
Second Written Opinion of the corresponding Singaporean application No. 11201908770X, dated Aug. 25, 2022.
Third Office Action of the corresponding Canadian application No. 3057178, dated Sep. 13, 2022.

* cited by examiner

WIRELESS COMMUNICATION METHOD AND DEVICE

CROSS-REFERENCE TO RELATED APPLICATION

This is a U.S. national phrase application under 35 U.S.C. 371 of International Patent Application No. PCT/CN2017/077766, filed on Mar. 22, 2017, the disclosure of which is incorporated by reference herein in its entirety for all purposes.

TECHNICAL FIELD

The present disclosure relates to the field of communications, and more particularly to a wireless communication method and device.

BACKGROUND

In an existing Long Term Evolution (LTE) system, along with constant increasement of maximum capabilities supported by terminal devices, a network device may configure different function parameters according to different terminal capabilities to meet service requirements of users.

A terminal device supports a quite high capability. However, the terminal capability is achieved in ideal conditions, for example, in single-service and single-network conditions. It is difficult to achieve a maximum terminal capability in a practical network.

SUMMARY

Embodiments of the present disclosure provide a wireless communication method and device.

A first aspect provides a wireless communication method, which may include the following operations.

A terminal device sends a first message to an access network device. The first message carries at least one of first capability information or first function parameter information, the first capability information is used for indicating the access network device that a maximum communication capability of the terminal device is needed to be updated into a first communication capability, and the first function parameter information is used for indicating the access network device that a function parameter of the terminal device for communication is needed to be updated into a first function parameter, or that a value range of the function parameter of the terminal device for communication is needed to be updated into a first value.

The terminal device receives a second message from the access network device. The second message carries the function parameter or the value range of the function parameter configured for the terminal device by the access network device according to the at least one of the first capability information or the first function parameter information.

In combination with the first aspect, in a possible implementation of the first aspect, before the operation that the terminal device sends the first message to the access network device, the method may include that, the terminal device determines according to a present condition of the terminal device, at least one: of the first communication capability, the first function parameter, or the first value range of the function parameter.

In combination with the first aspect or any abovementioned possible implementation thereof, in a possible implementation of the first aspect, the second message may be a reconfiguration message.

In combination with the first aspect or any abovementioned possible implementation thereof, before the operation that the terminal device sends the first message to the access network device, the method may further include the following operations.

The terminal device sends a third message to the access network device, wherein the third message carries second capability information and the second capability information used for indicating the maximum communication capability of the terminal device.

The first capability information is used for indicating the maximum communication capability indicated by the second capability information to be updated into the first communication capability, and the first function parameter information is used for indicating the function parameter or the value range of the function parameter configured for the terminal device by the access network device according to the maximum communication capability to be updated into the first function parameter or the first value range of the function parameter.

In combination with the first aspect or any abovementioned possible implementation thereof, before the operation that the terminal device sends the third message to the access network device, the method may further include that, the terminal device receives a fourth message from the access network device. The fourth message may be used for requesting for the maximum communication capability of the terminal device.

In combination with the first aspect or any abovementioned possible implementation thereof, the third message may be a message sent to the access network device during an attachment process.

In combination with the first aspect or any abovementioned possible implementation thereof, before the operation that the terminal device sends the first message to the access network device, the method may further include that, the terminal device receives a fifth message from the access network device. The fifth message may be used for indicating at least one of: a communication capability supported by the network device, the function parameter supported by the network device, or the value range of the function parameter supported by the network device.

At least one of the first communication capability, the first function parameter, or the first value range of the function parameter are/is determined according to at least one of: the communication capability supported by the network device, the function parameter supported by the network device, or the value range of the function parameter supported by the network device.

In combination with the first aspect or any abovementioned possible implementation thereof, the maximum communication capability of the terminal device may include at least one of: a maximum number of carriers supported for carrier aggregation communication, a maximum number of antennas supported for Multiple Input Multiple Output (MIMO) communication, a maximum number of carriers supported for dual connectivity communication, or a maximum receiver capability corresponding to an interference cancellation function.

In combination with the first aspect or any abovementioned possible implementation thereof, the function parameter or the value range of the function parameter of the terminal device for communication may include at least one of: a number or number range of carriers for carrier aggregation communication, a number or number range of antennas for MIMO communication, a number or number range of carriers for dual connectivity communication, or a receiver capability or capability range corresponding to the interference cancellation function.

A second aspect provides a wireless communication method, which may include the following operations.

An access network device receives a first message from a terminal device. The first message carries at least one of first capability information or first function parameter information, the first capability information is used for indicating the access network that the communication capability is needed to be updated into a first communication capability, and the first function parameter information is used for indicating the access network device that a function parameter of the terminal device for communication is needed to be updated into a first function parameter, or that a value range of the function parameter of the terminal device for communication is needed to be updated into a first value.

The access network device sends a second message to the terminal device, wherein the second message carries the function parameter or the value range of the function parameter configured for the terminal device by the access network device according to the at least one of the first capability information or the first function parameter information.

In combination with the second aspect, in a possible implementation of the second aspect. the second message may be a reconfiguration message.

In combination with the second aspect or any abovementioned possible implementation thereof, in a possible implementation of the second aspect, before the operation that the access network device receives the first message from the terminal device, the method may further include that, the access network device receives a third message from the terminal device. The third message carries second capability information and the second capability information used for indicating the maximum communication capability of the terminal device.

The first capability information is used for indicating the maximum communication capability indicated by the second capability information is needed to be updated into the first communication capability, and the first function parameter information is used for indicating the function parameter or the value range of the function parameter configured for the terminal device by the access network device according to the maximum communication capability is needed to be updated into the first function parameter or the first value range of the function parameter.

In combination with the second aspect or any abovementioned possible implementation thereof, in a possible implementation of the second aspect, before the operation that the access network device receives the third message from the terminal device, the method may further include that, the access network device sends a fourth message to the terminal device. The fourth message is used for requesting for the maximum communication capability that the terminal device may presently support.

In combination with the second aspect or any abovementioned possible implementation thereof, in a possible implementation of the second aspect, the third message may be a message sent to the access network device by the terminal device during an attachment process.

In combination with the second aspect or any abovementioned possible implementation thereof, in a possible implementation of the second aspect, before the operation that the access network device receives the first message from the terminal device, the method may further include the following operation.

The access network device sends a fifth message to the terminal device, wherein the fifth message used for indicating at least one of a communication capability supported by the network device, the function parameter supported by the network device, or the value range of the function parameter supported by the network device to enable the terminal device to send the first message according to the fifth message.

In combination with the second aspect or any abovementioned possible implementation thereof, in a possible implementation of the second aspect, before the operation that the access network device sends the fifth message to the terminal device, the method may further include the following operation.

The access network device determines at least one of the communication capability supported by the network device, the function parameter supported by the network device, or the value range of the function parameter supported by the network device according to a present network communication condition.

In combination with the second aspect or any abovementioned possible implementation thereof, in a possible implementation of the second aspect, the method may further include the following operation.

When the terminal device switches a present serving access network device from the serving access network device to another access network device, the access network device sends a sixth message to the other access network device, wherein the sixth message carries the at least one of the first capability information or the first function parameter information.

In combination with the second aspect or any abovementioned possible implementation thereof, in a possible implementation of the second aspect, the sixth message may further contain at least one of: a communication capability of the terminal device before the updating operation, or a value range of the function parameter of the terminal device before the updating operation.

In combination with the second aspect or any abovementioned possible implementation thereof, in a possible implementation of the second aspect, the maximum communication capability of the terminal device may include at least one of:

a maximum number of carriers supported for carrier aggregation communication, a maximum number of antennas supported for MIMO communication, a maximum number of carriers supported for dual connectivity communication. or a maximum receiver capability corresponding to an interference cancellation function.

In combination with the second aspect or any abovementioned possible implementation thereof, in a possible implementation of the second aspect, the function parameter or the value range of the function parameter of the terminal device for communication may include at least one of:

a number or number range of carriers for carrier aggregation communication, a number or number range of antennas for MIMO communication, a number or number range of carriers for dual connectivity communication, or a receiver capability or capability range corresponding to the interference cancellation function.

A third aspect provides a terminal device, which may include units configured to implement the method in the first aspect or any possible implementation thereof.

A fourth aspect provides an access network device, which may include units configured to implement the method in the second aspect or any possible implementation thereof.

A fifth aspect provides a terminal device, which may include a memory and a processor. The memory stores instructions, and the processor is configured to call the instructions stored in the memory to execute the method in the first aspect or any optional implementation thereof.

A sixth aspect provides an access network device, which may include a memory and a processor. The memory stores instructions, and the processor is configured to call the instructions stored in the memory to execute the method in the second aspect or any optional implementation thereof.

A seventh aspect provides a computer-readable medium, which stores a program code configured to be executed by a terminal device, the program code including instructions configured to execute the method in the first aspect or each implementation thereof or including instructions configured to execute the method in the second aspect or each implementation thereof.

An eighth aspect provides a system chip, which includes an input interface, an output interface, a processor and a memory. The processor is configured to execute a code in the memory. When the code is executed, the processor may implement the method in the first aspect and each implementation or execute the method in the second aspect and each implementation.

BRIEF DESCRIPTION OF DRAWINGS

In order to describe the technical solutions of the embodiments of the present disclosure more clearly, the drawings required to be used in descriptions about the embodiments or a conventional art will be simply introduced below. It is apparent that the drawings described below are only some embodiments of the present disclosure. Other drawings may further be obtained by those of ordinary skill in the art according to these drawings without creative work.

DETAILED DESCRIPTION

The technical solutions in the embodiments of the present disclosure will be described below in combination with the drawings in the embodiments of the present disclosure. It is apparent that the described embodiments are not all embodiments but part of embodiments of the present disclosure. All other embodiments obtained by those of ordinary skill in the art based on the embodiments in the present disclosure without creative work shall fall within the scope of protection of the present disclosure.

The technical solutions of the embodiments of the present disclosure may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), an LTE system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) system.

Figure 1:
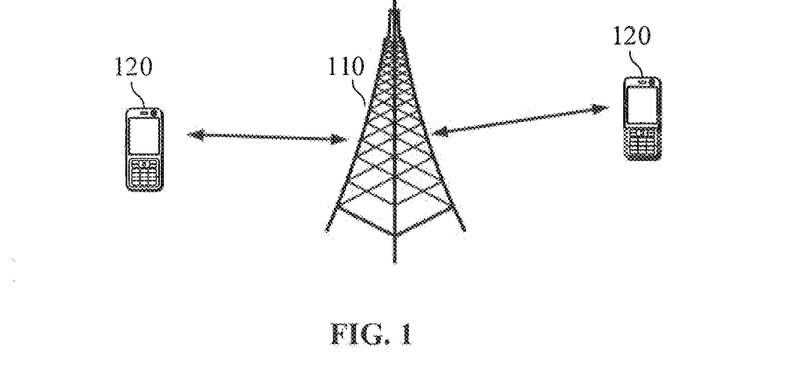
FIG. 1 illustrates a schematic diagram of a wireless communication system according to an embodiment of the present disclosure.

FIG. 1 illustrates a wireless communication system 100 to which the embodiments of the present disclosure are applied. The wireless communication system 100 may include an access network device 110. The access network device 110 may be a device communicating with a terminal device. Each access network device 110 may provide communication coverage for a specific geographical region and may communicate with a terminal device (for example, User Equipment (UE)) in the coverage. Alternatively, the access network device 110 may be a Base Transceiver Station (BTS) in the GSM or the CDMA system, may also be a NodeB (NB) in the WCDMA system, and may further be an Evolutional Node B (eNB or eNodeB) in the LTE system or a wireless controller in a Cloud Radio Access Network (CRAN). Or the access network device may be a relay station, an access point, a vehicle-mounted device, a wearable device, a network-side device in a future 5G network, an access network device in a future evolved Public Land Mobile Network (PLMN) or the like.

The wireless communication system 100 further includes at least one terminal device 120 within the coverage of the access network device 110. The terminal device 120 may be mobile or stationary. Alternatively, the terminal device 120 may be an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device, another processing device connected to a wireless modem, a vehicle-mounted device, a wearable device, a terminal device in the future 5G network, a terminal device in the future evolved PLMN or the like.

Alternatively, the terminal device 120 may perform Device to Device (D2D) communication.

Alternatively, the 5G system or network may also be called a New Radio (NR) system or network.

An access network device and two terminal devices are exemplarily illustrated in FIG. 1. Alternatively, the wireless communication system 100 may include multiple access network devices and another number of terminal devices may be included in coverage of each access network device. There are no limits made thereto in the embodiments of the present disclosure.

Alternatively, the wireless communication system 100 may further include another network entity such as a network controller and a mobility management entity. There are no limits made thereto in the embodiments of the present disclosure.

It is to be understood that use of terms "system" and "network" in the disclosure may usually be exchanged in the disclosure. In the disclosure, term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

Figure 2:
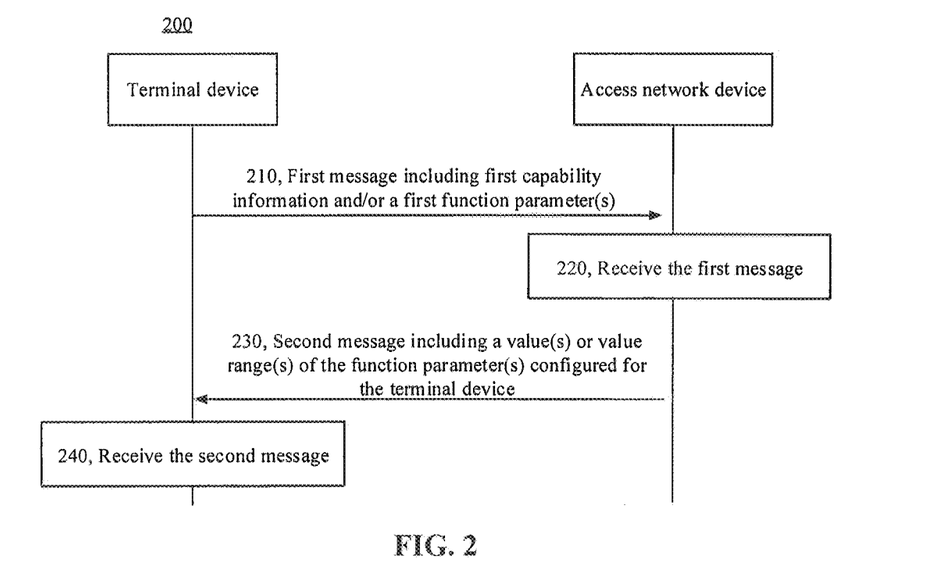
FIG. 2 illustrates a schematic flowchart of a wireless communication method according to an embodiment of the present disclosure.

FIG. 2 illustrates a schematic flowchart of a wireless communication method 200 according to an embodiment of the present disclosure. The method 200 may be applied, but not limited, to the system illustrated in FIG. 1. As illustrated in FIG. 2, the method 200 includes the following steps.

In 210, a terminal device sends a first message to an access network device. The first message carries at least one of first capability information or first function parameter information, the first capability information is used for indicating the access network device that a maximum communication capability of the terminal device is needed to be updated into a first communication capability, and the first function parameter information is used for indicating the access network device that a function parameter(s) of the terminal device for communication is needed to be updated into a first function parameter(s), or that a value range(s) of the function parameter(s) of the terminal device for communication is needed to be updated into the first value range(s) of the function parameter(s).

Alternatively, before the terminal device sends the first message to the access network device, the terminal device determines the first communication capability or the first value and/or value range of the function parameter according to a present communication condition.

Specifically, the terminal device may determine the first communication capability and/or the first function parameter(s) or the first value range(s) of the function parameter(s) according to its own present condition, for example, according to whether the terminal device is overheated or according to a communication requirement.

Alternatively, the access network device sends a fifth message to the terminal device. The fifth message used for indicating a communication capability and/or a function parameter(s) or value range(s) of the function parameter(s) supported by the network device, the terminal device receives the fifth message from the access network device, and the terminal device determines the first communication capability and/or the first function parameter(s) or the first value range(s) of the function parameter(s) according to the communication, capability and/or the function parameter(s) or value range(s) of the function parameter(s) supported by the network device.

Specifically, the access network device may determine the communication capability and/or the function parameter(s) or value range(s) of the function parameter(s) that may be supported to be used by the terminal device according to a present network condition, and send the communication capability and/or the function parameter(s) or value range(s) of the function parameter(s) supported to be used by the terminal device to the terminal device through the fifth message. The terminal device, after receiving the fifth message, may determine the first communication capability and/or the first function parameter(s) or the first value range(s) of the function parameter(s), based on its own condition and the communication capability and/or the function parameter range that the network device supports the terminal device to use. Herein, the first communication capability may belong to the communication capability that the access network device supports the terminal device to use, and the first function parameter or the first value range of the function parameter may also belong to the function parameter or the value range of the function parameter that the access network device supports the terminal device to use.

Of course, the first communication capability may not belong to the communication capability that the access network device supports the terminal device to use, or, the first function parameter(s) or the first value range(s) of the function parameter(s) may not belong to the function parameter(s) or value range(s) of the function parameter(s) that the access network device supports the terminal device to use.

It is to be understood that, in the embodiment of the present disclosure, the communication capability and/or the function parameter(s) or value range(s) of the function parameter(s) supported by the network device may be a communication capability and/or a value range of the function parameter supported by the network device in a communication process of the terminal device and the network device.

Herein, the network device may support different communication capabilities and/or value ranges of the function parameter for different terminal devices.

Or, the network device may support different communication capabilities and/or different value ranges of the function parameter(s) for different terminal device groups and support the same communication capability and/or the same value range(s) of the function parameter(s) for terminal devices in the same terminal device group.

Or, the network device may support the same communication capability and/or the same value range(s) of the function parameter(s) for terminal devices within its coverage.

Alternatively, the fifth message may be dedicated signaling, or broadcast signaling and the like.

In 220, the access network device receives the first message from the terminal device.

In 230, the access network device sends a second message to the terminal device. The second message carries the function parameter(s) or the value range(s) of the function parameter(s) configured for the terminal device by the access network device according to the first capability information and/or the first function parameter information.

Specifically, the access network device, after receiving the first message from the terminal device, may configure the function parameter(s) or value range(s) of the function parameter(s) for the terminal device according to the first communication capability and/or first function parameter(s) or the first value range(s) of the function parameter(s) in the first message, and the access network device carries the function parameter(s) or value range(s) of the function parameter(s) configured for the terminal device through the second message.

Alternatively, the second message is a reconfiguration message.

In 240, the terminal device receives the second message from the access network device.

Specifically, the terminal device may receive the second message from the access network device and communicate according to the function parameter(s) or value range(s) of the function parameter(s) configured for the terminal device by the access network device in the second message.

Alternatively, in the embodiment of the present disclosure, the maximum communication capability of the terminal device includes at least one of:

a maximum number of carriers supported for carrier aggregation communication, a maximum number of antennas supported for MIMO communication, a maximum number of carriers supported for dual connectivity communication, or a maximum receiver capability corresponding to an interference cancellation function.

The function parameter(s) or value range(s) of the function parameter(s) of the terminal device for communication includes:

a number or number range of carriers for carrier aggregation communication, a number or number range of antennas for MIMO communication, a number or number range of carriers for dual connectivity communication, or a receiver capability or capability range corresponding to the interference cancellation function.

Alternatively, in the embodiment of the present disclosure, before the terminal device sends the first message to the access network device, the terminal device sends a third message to the access network device. The third message carries second capability information, the second capability information is used for indicating the maximum communication capability of the terminal device. Herein, the first capability information is used for indicating the maximum communication capability indicated by the second capability information is needed to be updated into the first communication capability, and the first function parameter information is used for indicating the function parameter(s) or value range(s) of the function parameter(s) configured for the terminal device by the access network device according to the maximum communication capability is/are to be updated into the first function parameter(s) or the first value range(s) of the function parameter(s).

Alternatively, before the terminal device sends the third message to the access network device, the terminal device receives a fourth message from the access network device. The fourth message is used for requesting for the maximum communication capability of the terminal device.

Alternatively, the third message is a message sent to the access network device by the terminal device during an attachment process.

Alternatively, in the embodiment of the present disclosure, the first communication capability may be called a temporary communication capability, and the first function parameter(s) or the first value range(s) of the function parameter(s) may be called a temporary function parameter(s) or value range(s) of the function parameter(s).

Alternatively, in the embodiment of the present disclosure, the access network device's updating operation of the maximum communication capability of the terminal device by use of the first communication capability does not means that the original maximum communication capability is invalid, and the access network device may store the first communication capability and the maximum communication capability before the updating operation, and configure the function parameter(s) or value range(s) of the function parameter(s) by use of the first communication capability and the maximum communication capability before the updating operation.

For example, the function parameter(s) or value range(s) of the parameter(s) configured based on the first communication capability is(are) applicable within a predetermined time period after receiving the first message, and the function parameter(s) or value range(s) of the function parameter(s) configured based on the maximum communication capability before the updating operation is(are) applicable within other time periods.

For example, the function parameter(s) or value range(s) of the parameter(s) configured based on the first communication capability may be applied to configuration of the function parameter(s) for a certain service, and when the service changes, the function parameter(s) or value range(s) of the function parameter(s) may be configured based on the maximum communication capability before the updating operation.

Similarly, existence of the first function parameter(s) or the first value range(s) of the function parameter(s) does not mean that the original parameter(s) or value range(s) of the parameter(s) configured according to the maximum communication capability is invalid.

Figure 3:
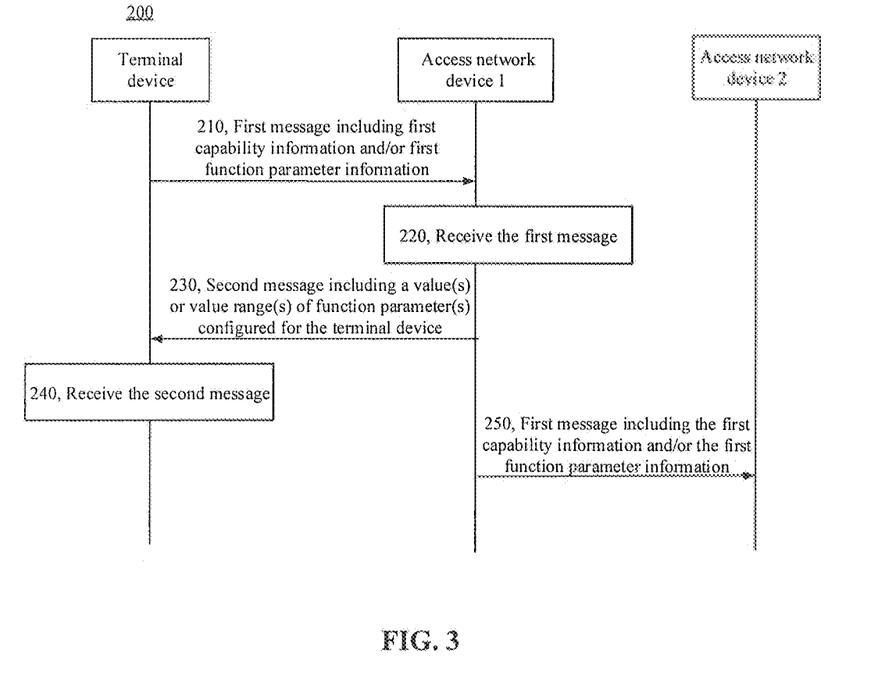
FIG. 3 illustrates a schematic flowchart of a wireless communication method according to an embodiment of the present disclosure.

FIG. 3 illustrates a schematic flowchart of a wireless communication method 300 according to an embodiment of the present disclosure. As illustrated in FIG. 3, the wireless communication method 300 includes the following steps.

In 310, a terminal device sends a first message to an access network device 1. The first message carries first capability information and/or first function parameter information, the first capability information is used for indicating the access network device 1 that a maximum communication capability of the terminal device is needed to be updated into a first communication capability, and the first function parameter information is used for indicating the access network device 1 that a function parameter(s) of the terminal device for communication is needed to be updated into a first function parameter(s), or that a value range(s) of the function parameter(s) of the terminal device for communication is needed to be updated into the first value range(s) of the function parameter(s).

In 320, the access network device 1 receives the first message from the terminal device.

In 330, the access network device 1 sends a second message to the terminal device. The second message carries the function parameter(s) or value range(s) of the function parameter(s) configured for the terminal device by the access network device 1 according to the first capability information and/or the first function parameter information.

In 340, the terminal device receives the second message from the access network device 1.

In 350, when a present serving access network device is changed from the access network device 1 to an access network device 2 by the terminal device, the access network device 1 sends a sixth message to the access network device 2. The sixth message carries the first capability information and/or the first function parameter information.

Specifically, when the terminal device needs to change the access network device, an original serving access network device for the terminal device in a network may send the updated capability information or function parameter(s) or value range(s) of the function parameter(s) to a target access network device in a handover command, and the target access network device may configure the terminal device according to the updated capability information and/or function parameter(s) or value range(s) of the function parameter(s).

Alternatively, the sixth message further carries at least one of: a communication capability of the terminal device before the updating operation, or a value range(s) of the function parameter(s) of the terminal device before the updating operation.

In the embodiment of the present disclosure, the terminal device sends the first message to the access network device. The first message includes the first capability information or the first function parameter information, the first capability information is used for indicating the access network device that the maximum communication capability of the terminal device is needed to be updated into the first communication capability, and the first function parameter information is used for indicating the access network device that the function parameter(s) of the terminal device for communication is needed to be updated into the first function parameter(s), or that the value range(s) of the function parameter(s) of the terminal device for communication is needed to be updated into the first value range(s) of the function parameter(s); and the access network device, after receiving the first message, may configure the function parameter(s) or value range(s) of the function parameter(s) for the terminal device according to the first capability information and/or the first function parameter information, so that the terminal device may update its own communication capability and/or function parameter(s) or value range(s) of the function parameter(s), and report the same to the access network device as required. Therefore, the embodiments can avoid the condition in which the function parameter or the value range of the function parameter configured for the terminal device by the access network device according to the stored maximum communication capability of the terminal device is inconsistent with the present condition of the terminal device, which will cause poor communication performance of the terminal device or damages to hardware of the terminal device (for example, storage overflow of the terminal device or overheating of the terminal device).

Figure 4:
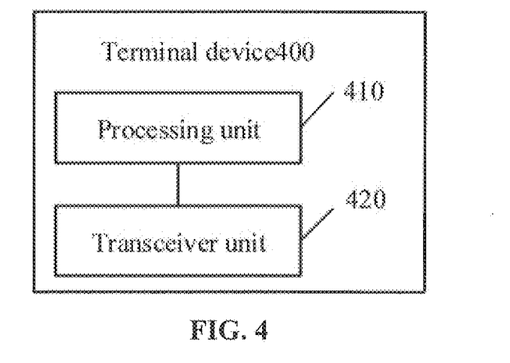
FIG. 4 illustrates a schematic block diagram off terminal device according to an embodiment of the present disclosure.

FIG. 4 illustrates a schematic block diagram of a terminal device 400 according to an embodiment of the present disclosure. As illustrated in FIG. 4, the terminal device 400 includes a processing unit 410 and a transceiver unit 420.

The processing unit is configured to generate a first message. The first message carries first capability information and/or first function parameter information, the first capability information is used for indicating an access network device that a maximum communication capability of the terminal device is needed to be updated into a first communication capability, and the first function parameter information is used for indicating the access network device that a function parameter(s) of the terminal device for communication is needed to be updated into a first function parameter(s), or that a value range(s) of the function parameter(s) of the terminal device for communication is needed to be updated into the first value range(s) of the function parameter(s).

The transceiver unit is configured to send the first message to the access network device and receive a second message from the access network device. The second message carries the function parameter(s) or value range(s) of the function parameter(s) configured for the terminal device by the access network device according to the first capability information and/or the first function parameter information.

Alternatively, the processing unit is further configured to determine the first communication capability and/or the first function parameter(s) or the first value range(s) of the function parameter(s) according to a present condition of the terminal device.

Alternatively, the second message is a reconfiguration message.

Alternatively, the transceiver unit is further configured to send a third message to the access network device. The third message carries second capability information, and the second capability information used for indicating the maximum communication capability of the terminal device.

The first capability information is used for indicating the maximum communication capability indicated by the second capability information is needed to be updated into the first communication capability, and the first function parameter information is used for indicating the function parameter(s) or value range(s) of the function parameter(s) configured for the terminal device by the access network device according to the maximum communication capability is/are to be updated into the first function parameter(s) or the first value range(s) of the function parameter(s).

Alternatively, the transceiver unit is further configured to receive a fourth message from the access network device. The fourth message is used for requesting for the maximum communication capability of the terminal device.

Alternatively, the third message is a message sent to the access network device during an attachment process.

Alternatively, the transceiver unit is further configured to receive a fifth message from the access network device. The fifth message used for indicating the communication capability and/or function parameter(s) or value range(s) of the function parameter(s) supported by the network device.

The processing unit is further configured to determine the first communication capability and/or the first function parameter(s) or the first value range(s) of the function parameter(s) according to the communication capability and/or first function parameter(s) or the first value range(s) of the function parameter(s) or value range(s) of the function parameter(s) supported by the network device.

Alternatively, the maximum communication capability of the terminal device includes at least one of:

a maximum number of carriers supported for carrier aggregation communication, a maximum number of antennas supported for MIMO communication, a maximum number of carriers supported for dual connectivity communication, or a maximum receiver capability corresponding to an interference cancellation function.

Alternatively, the function parameter(s) or value range(s) of the function parameter(s) of the terminal device for communication includes:

a number or number range of carriers for carrier aggregation communication, a number or number range of antennas for MIMO communication, a number or number range of carriers for dual connectivity communication and a receiver capability or capability range corresponding to the interference cancellation function.

It is to be understood that the terminal device may correspond to the terminal devices in the method embodiments 200 and 300, may realize corresponding functions realized by the terminal device in the method embodiment 200 or 300 and, for simplicity, will not be elaborated herein.

Figure 5:
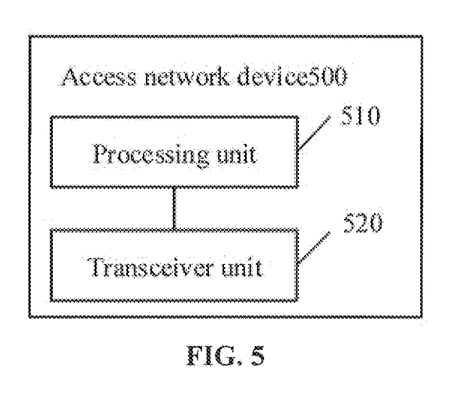
FIG. 5 illustrates a schematic block diagram of an access network device according to an embodiment of the present disclosure.

FIG. 5 illustrates a schematic block diagram of an access network device 500 according to an embodiment of the present disclosure. As illustrated in FIG. 5, the access network device includes a processing unit 510 and a transceiver unit 520.

The transceiver unit is configured to receive a first message from a terminal device. The first message carries first capability information and/or first function parameter information, the first capability information is used for indicating the access network that the communication capability is needed to be updated into a first communication capability, and the first function parameter information is used for indicating the access network device that a function parameter(s) of the terminal device for communication is needed to be updated into a first function parameter(s), or that a value range(s) of a function parameter(s) of the terminal device for communication is needed to be updated into the first value range(s) of the function parameter(s).

The processing unit is further configured to generate a second message. The second message carries the function parameter(s) or value range(s) of the function parameter(s) configured for the terminal device by the access network device according to the first capability information and/or the first function parameter information.

The transceiver unit is further configured to send the second message to the terminal device.

Alternatively, the second message is a reconfiguration message.

Alternatively, the transceiver unit is further configured to receive a third message from the terminal device. The third message carries second capability information, and the second capability information used for indicating the maximum communication capability of the terminal device, The first capability information is used for indicating the maximum communication capability indicated by the second capability information is needed to be updated into the first communication capability, and the first function parameter information is used for indicating the function parameter(s) or value range(s) of the function parameter(s) configured for the terminal device by the access network device according to the maximum communication capability is/are to be updated into the first function parameter(s) or the first value range(s) of the function parameter(s).

Alternatively, the transceiver unit is further configured to send a fourth message to the terminal device. The fourth message is used for requesting for the maximum communication capability that the terminal device presently supports.

Alternatively, the third message is a message sent to the access network device by the terminal device during an attachment process.

Alternatively, the transceiver unit is further configured to send a fifth message to the terminal device. The fifth message used for indicating a communication capability and/or function parameter(s) or value range(s) of the function parameter(s) supported by the network device to enable the terminal device to send the first message according to the fifth message.

Alternatively, the processing unit is further configured to determine the communication capability and/or function parameter(s) or value range(s) of the function parameter(s) that the network device supports the terminal device to use according to a present communication condition of network.

Alternatively, the transceiver unit is further configured to, when a present serving access network device is switched from the access network device to another access network device, send a sixth message to the other access network device. The sixth message carries the first capability information and/or the first function parameter information.

Alternatively, the sixth message further carries at least one of: a communication capability of the terminal device before the updating operation, or a value range of the function parameter of the terminal device before the updating operation.

Alternatively, the maximum communication capability of the terminal device includes at least one of:

a maximum number of carriers supported for carrier aggregation communication, a maximum number of antennas supported for MIMO Communication, a maximum number of carriers supported for dual connectivity communication, or a maximum receiver capability corresponding to an interference cancellation function.

Alternatively, the function parameter(s) or value range(s) of the function parameter(s) of the terminal device for communication includes at least one of:

a number or number range of carriers for carrier aggregation communication, a number or number range of antennas for MIMO communication, a number or number range of carriers for dual connectivity communication, or a receiver capability or capability range corresponding to the interference cancellation function.

It is to be understood that the access network device may correspond to the access network devices in the method embodiments 200 and 300, may realize corresponding functions realized by the access network device in the method embodiment 200 or 300 and, for simplicity, will not be elaborated herein.

Figure 6:
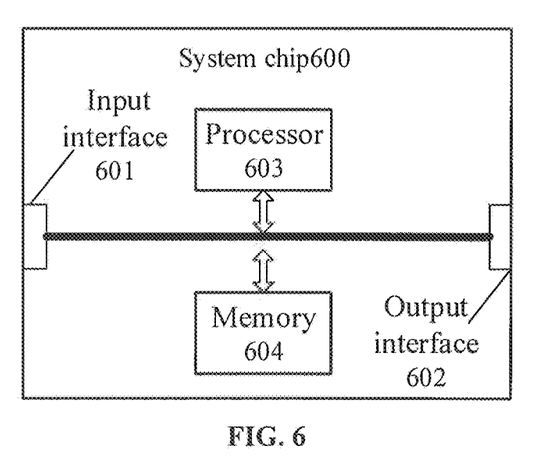
FIG. 6 illustrates a schematic block diagram of a system chip according to an embodiment of the present disclosure.

FIG. 6 illustrates a schematic structure diagram of a system chip 600 according to an embodiment of the present disclosure. The system chip 600 of FIG. 6 includes an input interface 601, output interface 602, processor 603 and memory 604 which may be connected through an internal communication connecting line. The processor 603 is configured to execute a code in the memory 704.

Alternatively, when the code is executed, the processor 603 implements the method executed by the terminal device in the method 200 or 300 illustrated in FIG. 2 or 3. For simplicity, no more elaborations will be made herein.

Alternatively, when the code is executed. the processor 603 implements the method executed by the access network device in the method 200 or 300 illustrated in FIG. 2 or 3. For simplicity, no more elaborations will be made herein.

Figure 7:
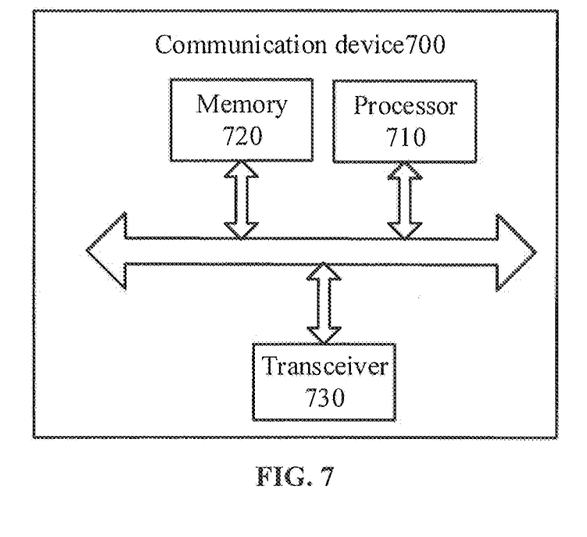
FIG. 7 illustrates a schematic block diagram of a communication device according to an embodiment of the present disclosure.

FIG. 7 illustrates a schematic block diagram of a communication device 700 according to an embodiment of the present disclosure. As illustrated in FIG. 7, the communication device 700 includes a processor 710 and a memory 720. Herein, the memory 720 may store a program code, and the processor 710 may execute the program code stored in the memory 720.

Alternatively, as illustrated in FIG. 7, the communication device 700 may include a transceiver 730, and the processor 710 may control the transceiver 730 for external communication.

Alternatively, the processor 710 may call the program code stored in the memory 720 to execute corresponding operations of the terminal device in the method 200 or 300 illustrated in FIG. 2 or 3. For similarity, no more elaborations will be made herein.

Alternatively, the processor 710 may call the program code stored in the memory 720 to execute corresponding operations of the access network device in the method 200 or 300 illustrated in FIG. 2 or 3. For similarity, no more elaborations will be made herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software, manner depends on specific applications and design constraints of the technical solutions. Professionals may realize the described functions for each specific application by use of different methods, but such realization shall fall within the scope of the present disclosure.

Those skilled in the art may clearly learn about that specific working processes of the system, device and unit described above may be seen from the corresponding processes in the method embodiment and will not be elaborated herein for convenient and brief description.

In some embodiments provided by the present disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the present disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the present disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in each embodiment of the present disclosure. The abovementioned storage medium includes: various media capable of storing program codes such as a U disk, a mobile hard disk, a Read-Only Memory (ROM), a Random Access Memory (RAM), a magnetic disk or an optical disk.

The above is only the specific implementation of the present disclosure and not intended to limit the scope of protection of the present disclosure. Any variations or replacements apparent to those skilled in the art within the technical scope disclosed by the present disclosure shall fall within the scope of protection of the present disclosure. Therefore, the scope of protection of the present disclosure shall be subject to the scope of protection of the claims.

What is claimed is:

1. A wireless communication method, comprising:
   sending, by a terminal device, a first message to an access network device, wherein the first message carries first capability information and first function parameter information, the first capability information is used for indicating the access network device that a maximum communication capability of the terminal device is needed to be updated into a first communication capability, and the first function parameter information is used for indicating the access network device that a function parameter of the terminal device for communication is needed to be updated into a first function parameter, or a value range of the function parameter of the terminal device for communication is needed to be updated into a first value range of the function parameter; and
   receiving, by the terminal device, a second message from the access network device, wherein the second message carries the function parameter or the value range of the function parameter configured for the terminal device by the access network device according to the first capability information and the first function parameter information;

the method further comprises:
   when the terminal device switches a present serving access network device from the access network device to another access network device, a sixth message is sent from the access network device to the another access network device,
   wherein the sixth message carries the first capability information and the first function parameter information;
and
   the sixth message further carries:
      a communication capability of the terminal device before the updating operation; and
      a function parameter information or a value range of the function parameter of the terminal device before the updating operation; and
   wherein the first communication capability is applied within a predetermined time period after receiving the first message, and the first function parameter or the first value range of the function parameter is applied within the predetermined time period after receiving the first message; and, the communication capability of the terminal device before the updating operation is applied within other periods, and the function parameter information or the value range of the function parameter of the terminal device before the updating operation is applied within the other periods.

2. The method of claim 1, before sending, by the terminal device, the first message to the access network device, comprising:
   determining, by the terminal device, according to a present condition of the terminal device, the first communication capability and the first function parameter,
   or,
   determining, by the terminal device, according to a present condition of the terminal device, the first communication capability and the first value range of the function parameter;
   wherein the present condition of the terminal device comprise at least one of: whether the terminal device being overheated, or, a communication requirement of the terminal device.

3. The method of claim 1, before sending, by the terminal device, the first message to the access network device, further comprising:
   sending, by the terminal device, a third message to the access network device, wherein the third message carries second capability information, and the second capability information used for indicating a maximum communication capability of the terminal device, wherein the third message is a message sent to the access network device during an attachment process;
   wherein the first capability information is used for indicating the maximum communication capability indicated by the second capability information is needed to be updated into the first communication capability, and the first function parameter information is used for indicating that the function parameter configured for the terminal device by the access network device according to the maximum communication capability is needed to be updated into the first function parameter, or that the value range of the function parameter configured for the terminal device by the access network device according to the maximum communication capability is needed to be updated into the first value range of the function parameter;

wherein before sending, by the terminal device, the third message to the access network device, the method further comprises:
receiving, by the terminal device, a fourth message from the access network device, wherein the fourth message is used for requesting for the maximum communication capability of the terminal device.

4. The method of claim 3, wherein the maximum communication capability of the terminal device comprises a maximum receiver capability corresponding to an interference cancellation function and at least one of:
a maximum number of carriers supported for carrier aggregation communication,
a maximum number of antennas supported for Multiple Input Multiple Output (MIMO) communication, or
a maximum number of carriers supported for dual connectivity communication; and
wherein the function parameter or the value range of the function parameter of the terminal device for communication comprises a receiver capability or capability range corresponding to an interference cancellation function and at least one of:
a number or number range of carriers for carrier aggregation communication,
a number or number range of antennas for MIMO communication, or
a number or number range of carriers for dual connectivity communication.

5. The method of claim 1, before sending, by the terminal device, the first message to the access network device, further comprising:
receiving, by the terminal device, a fifth message from the access network device, wherein the fifth message used for indicating at least one of: a communication capability supported by the access network device, a function parameter supported by the access network device, or a value range of the function parameter supported by the access network device; and
determining at least one of: the first communication capability, the first function parameter, or the first value range of the function parameter, according to at least one of: the communication capability supported by the access network device, the function parameter supported by the access network device, or the value range of the function parameter supported by the access network device.

6. The method of claim 1, wherein the at least one of the first communication capability supported by the access network device, the function parameter supported by the access network device, or the value range of the function parameter supported by the access network device is a respective one supported by the access network device in a communication process of the terminal device and the access network device.

7. The method of claim 1, wherein different first communication capabilities, different value ranges of the function parameter, or both are supported for different terminal devices by the access network device;
or,
different first communication capabilities, different value ranges of the function parameter, or both are supported for terminal devices in different terminal device groups by the access network device, and a same first communication capability, a same value range of the function parameter, or both are supported for terminal devices in a same terminal device group by the access network device.

8. A wireless communication method, comprising:
receiving, by an access network device, a first message from a terminal device, wherein the first message carries first capability information and first function parameter information, the first capability information is used for indicating the access network device that a maximum communication capability of the terminal device is needed to be updated into a first communication capability, and the first function parameter information is used for indicating the access network device that a function parameter of the terminal device for communication is needed to be updated into a first function parameter, or that a value range of the function parameter of the terminal device for communication is needed to be updated into a first value range of the function parameter; and
sending, by the access network device, a second message to the terminal device, wherein the second message carries the function parameter or the value range of the function parameter configured for the terminal device by the access network device according to the first capability information and the first function parameter information;
the method further comprises:
when the terminal device switches a present serving access network device from the access network device to another access network device, sending, by the access network device, a sixth message to the another access network device,
wherein the sixth message carries the first capability information and the first function parameter information; and
the sixth message further carries:
a communication capability of the terminal device before the updating operation; and
a function parameter information or a value range of the function parameter of the terminal device before the updating operation; and
wherein the first communication capability is applied within a predetermined time period after receiving the first message, and the first function parameter or the first value range of the function parameter is applied within the predetermined time period after receiving the first message; and, the communication capability of the terminal device before the updating operation is applied within other periods, and the function parameter information or the value range of the function parameter of the terminal device before the updating operation is applied within the other periods.

9. The method of claim 8, before receiving, by the access network device, the first message from the terminal device, comprising:
sending, by the access network device, a fifth message to the terminal device, wherein the fifth message used for indicating at least one of: a communication capability supported by the access network device, a function parameter supported by the access network device, or a value range of the function parameter supported by the access network device;
wherein the at least one of the communication capability supported by the access network device, the function parameter supported by the access network device, or the value range of the function parameter supported by the access network device is a respective one supported by the access network device in a communication process of the terminal device and the access network device.

10. The method of claim 8, wherein different communication capabilities, different value ranges of the function parameter, or both are supported for different terminal devices by the access network device;
or,
different communication capabilities, different value ranges of the function parameter, or both are supported for terminal devices in different terminal device groups by the access network device, and a same communication capability, a same value range of the function parameter, or both are supported for terminal devices in a same terminal device group by the access network device.

11. The method of claim 8, wherein the maximum communication capability of the terminal device comprises a maximum receiver capability corresponding to an interference cancellation function and at least one of:
a maximum number of carriers supported for carrier aggregation communication, a maximum number of antennas supported for Multiple Input Multiple Output (MIMO) communication, or
a maximum number of carriers supported for dual connectivity communication; and
wherein the function parameter or the value range of the function parameter of the terminal device for communication comprises a receiver capability or capability range corresponding to an interference cancellation function and at least one of:
a number or number range of carriers for carrier aggregation communication,
a number or number range of antennas for MIMO communication, or
a number or number range of carriers for dual connectivity communication.

12. The method of claim 8, before receiving, by the access network device, the first message from the terminal device, further comprising:
receiving, by the access network device, a third message from the terminal device, wherein the third message carries second capability information, and the second capability information used for indicating the maximum communication capability of the terminal device, wherein the third message is a message sent to the access network device during an attachment process;
wherein the first capability information is used for indicating the maximum communication capability indicated by the second capability information is needed to be updated into the first communication capability, and the first function parameter information is used for indicating that the function parameter configured for the terminal device by the access network device according to the maximum communication capability is needed to be updated into a first function parameter, or that the value range of the function parameter configured for the terminal device by the access network device according to the maximum communication capability is needed to be updated into a first value range of the function parameter;
wherein before receiving, by the access network device, the third message from the terminal device, the method further comprises:
sending, by the access network device, a fourth message to the terminal device, wherein the fourth message is used for requesting for the maximum communication capability that the terminal device presently supports.

13. A terminal device, comprising a processor and a transceiver, wherein
the processor is configured to generate a first message, wherein the first message carries first capability information ef-and first function parameter information, the first capability information is used for indicating an access network device that a maximum communication capability of the terminal device is needed to be updated into a first communication capability, and the first function parameter information is used for indicating the access network device that a function parameter of the terminal device for communication is needed to be updated into a first function parameter, or that a value range of the function parameter of the terminal device for communication is needed to be updated into a first value range of the function parameter; and
the transceiver is configured to send the first message to the access network device and receive a second message from the access network device, wherein the second message carries the function parameter or the value range of the function parameter configured for the terminal device by the access network device according to the first capability information and the first function parameter information;
wherein the transceiver is further configured to:
when the terminal device switches a present serving access network device from the access network device to another access network device, a sixth message is sent from the access network device to the another access network device,
wherein the sixth message carries the first capability information and the first function parameter information; and
the sixth message further carries:
a communication capability of the terminal device before the updating operation; and
a function parameter information or a value range of the function parameter of the terminal device before the updating operation; and
wherein the first communication capability is applied within a predetermined time period after receiving the first message, and the first function parameter or the first value range of the function parameter is applied within the predetermined time period after receiving the first message; and, the communication capability of the terminal device before the updating operation is applied within other periods, and the function parameter information or the value range of the function parameter of the terminal device before the updating operation is applied within the other periods.

14. The terminal device of claim 13, wherein the transceiver is further configured to:
receive a fifth message from the access network device, wherein the fifth message used for indicating at least one of: a communication capability supported by the access network device, a function parameter supported by the access network device, or a value range of the function parameter supported by the access network device; and
the processor is further configured to determine at least one of the first communication capability, a first function parameter, or a first value range of the function parameter according to at least one of: the communication capability supported by the access network device, the function parameter supported by the access network device, or the value range of the function parameter supported by the access network device.

15. The terminal device of claim 13, the transceiver is configured to send a third message to the access network device, wherein the third message carries second capability information, and the second capability information used for indicating a maximum communication capability of the terminal device, wherein the third message is a message sent to the access network device during an attachment process;
  wherein the first capability information is used for indicating the maximum communication capability indicated by the second capability information is needed to be updated into the first communication capability, and the first function parameter information is used for indicating that the function parameter configured for the terminal device by the access network device according to the maximum communication capability is needed to be updated into the first function parameter, or that the value range of the function parameter configured for the terminal device by the access network device according to the maximum communication capability is needed to be updated into the first value range of the function parameter;
  wherein the transceiver is further configured to receive a fourth message from the access network device, wherein the fourth message is used for requesting for the maximum communication capability of the terminal device.

16. An access network device, comprising a processor and a transceiver, wherein
  the transceiver is configured to receive a first message from a terminal device, wherein the first message carries first capability information and first function parameter information, the first capability information is used for indicating the access network device that a maximum communication capability of the terminal device is needed to be updated into a first communication capability, and the first function parameter information is used for indicating the access network device that a function parameter of the terminal device for communication is needed to be updated into a first function parameter, or that a value range of the function parameter of the terminal device for communication is needed to be updated into a first value range of the function parameter;
  the processor is further configured to generate a second message, wherein the second message carries the function parameter or the value range of the function parameter configured for the terminal device by the access network device according to the first capability information and the first function parameter information; and
  the transceiver is further configured to send the second message to the terminal device;
  wherein the transceiver is further configured to:
  when the terminal device switches a present serving access network device from the access network device to another access network device, send a sixth message to the another access network device,
  wherein the sixth message carries the first capability information and the first function parameter information; and
  the sixth message further carries:
    a communication capability of the terminal device before the updating operation; and
    a function parameter information or a value range of the function parameter of the terminal device before the updating operation; and
  wherein the first communication capability is applied within a predetermined time period after receiving the first message, and the first function parameter or the first value range of the function parameter is applied within the predetermined time period after receiving the first message; and, the communication capability of the terminal device before the updating operation is applied within other periods, and the function parameter information or the value range of the function parameter of the terminal device before the updating operation is applied within the other periods.

* * * * *